Dec. 21, 1965 U. C. LINTON 3,225,163
INDICATOR FUSEHOLDER WITH CURRENT RESPONSIVE DEVICE
Filed March 28, 1961 5 Sheets-Sheet 1
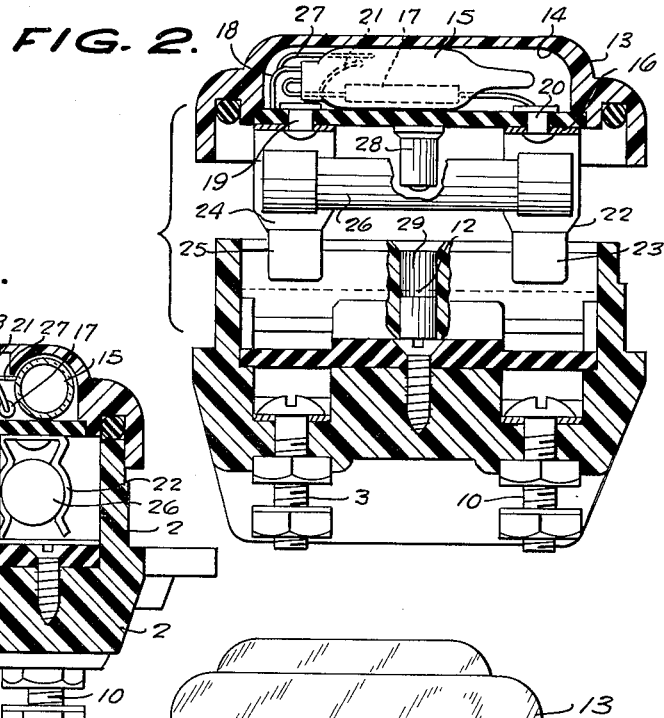
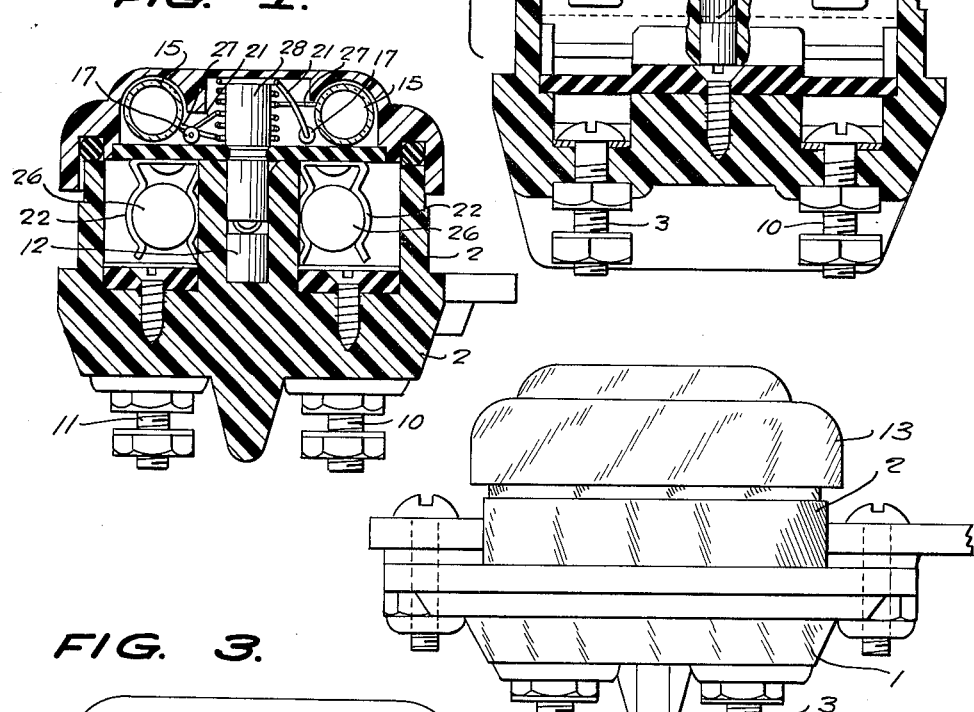
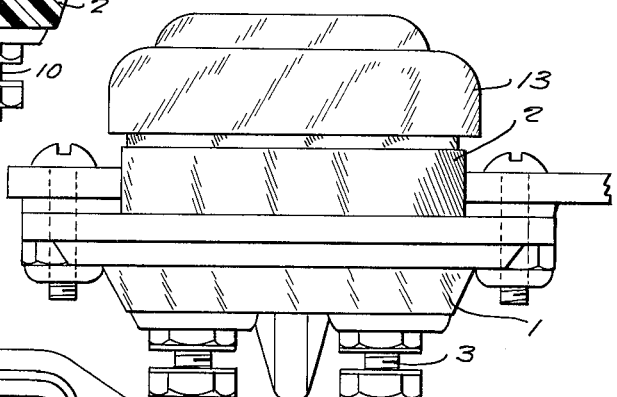
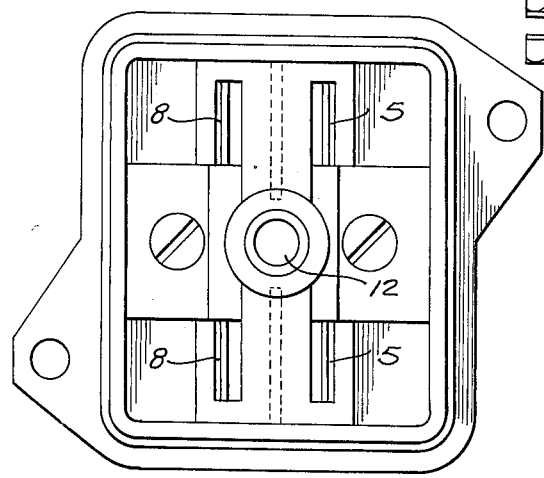
INVENTOR.
ULLE C. LINTON,
BY
Linton and Linton
ATTORNEYS.

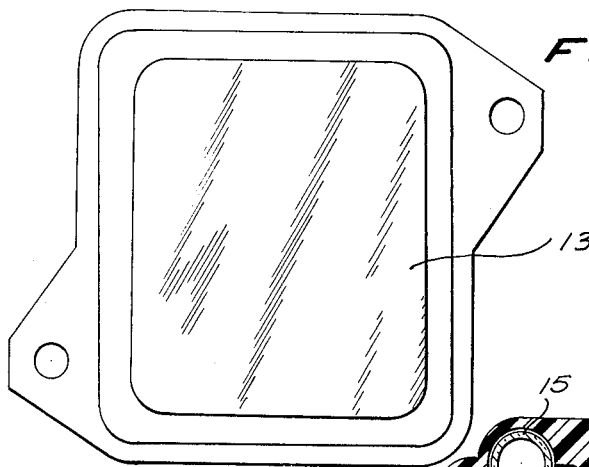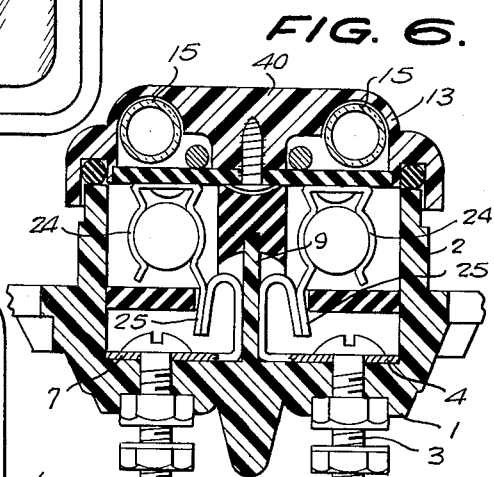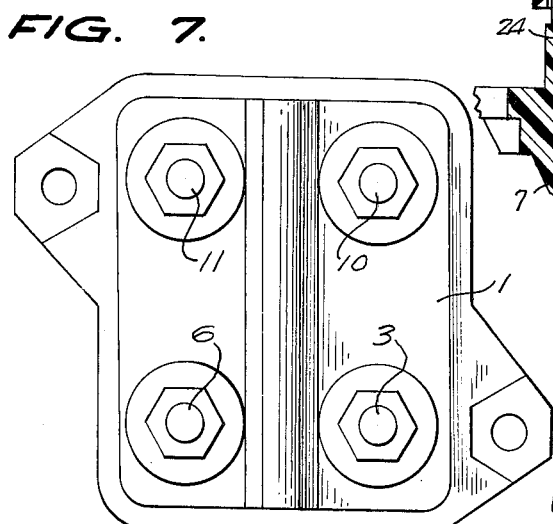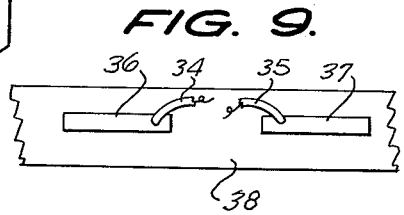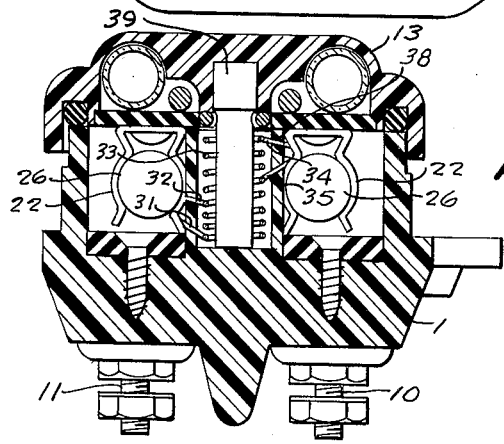

Dec. 21, 1965  U. C. LINTON  3,225,163
INDICATOR FUSEHOLDER WITH CURRENT RESPONSIVE DEVICE
Filed March 28, 1961  5 Sheets-Sheet 3
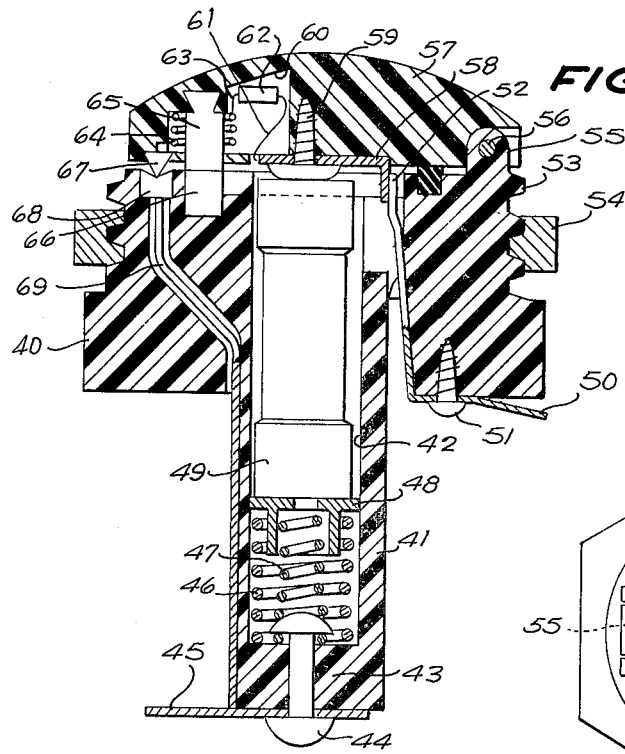
FIG. 10.
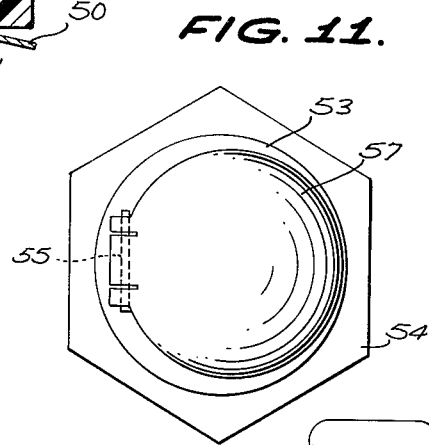
FIG. 11.
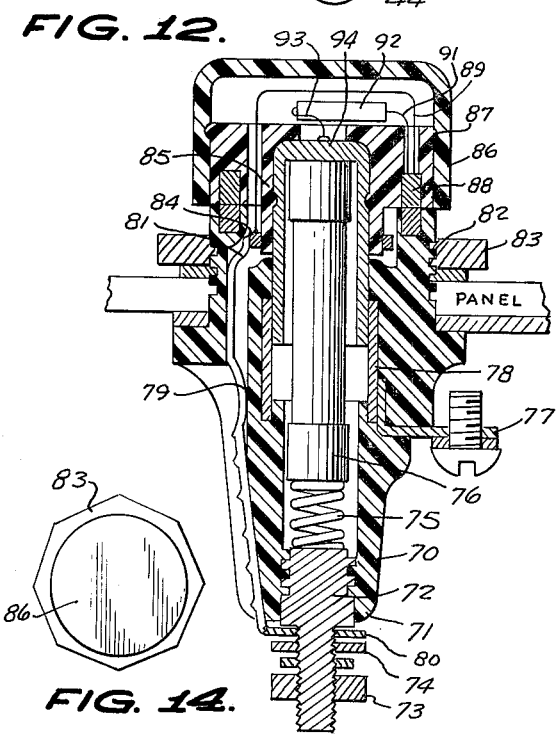
FIG. 12.
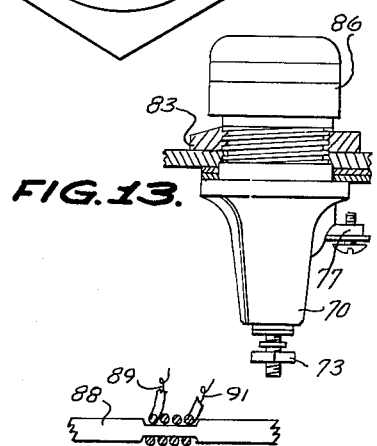
FIG. 13.
FIG. 15.
FIG. 14.
INVENTOR.
ULLE C. LINTON,
BY
*Linton and Linton*
ATTORNEYS.

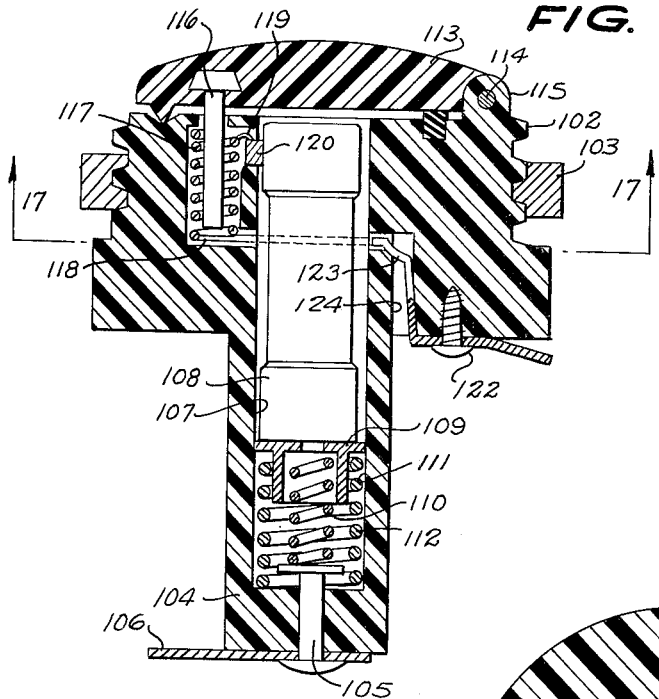
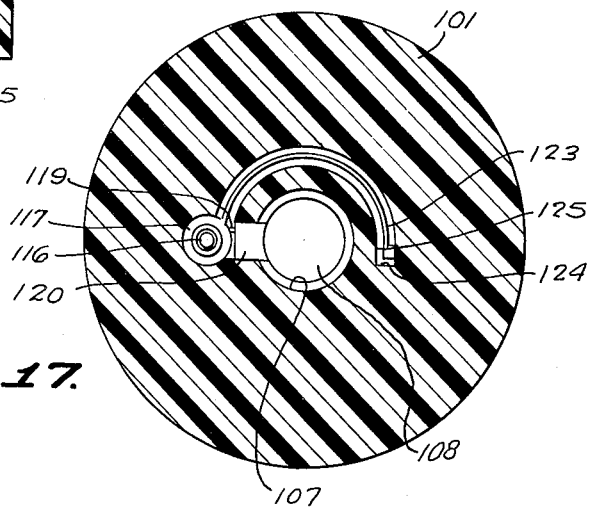

Dec. 21, 1965  U. C. LINTON  3,225,163
INDICATOR FUSEHOLDER WITH CURRENT RESPONSIVE DEVICE
Filed March 28, 1961  5 Sheets-Sheet 5
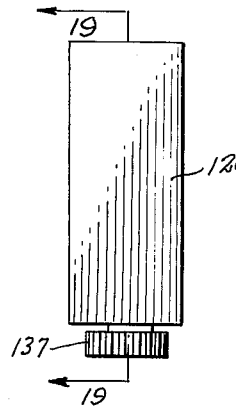
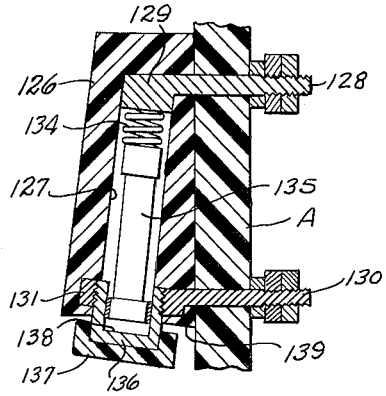
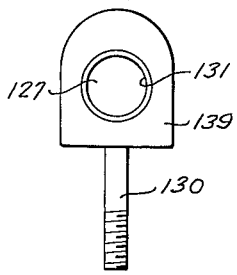
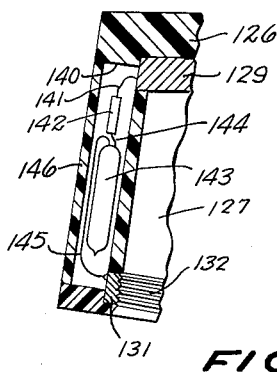
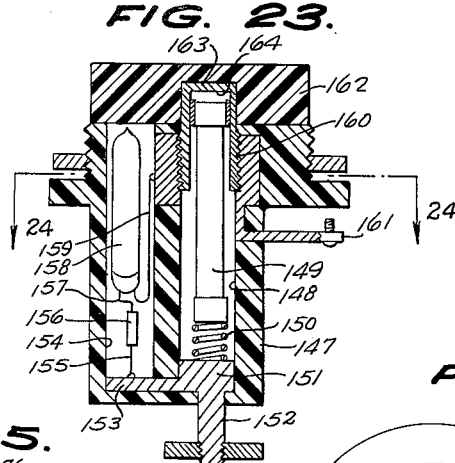
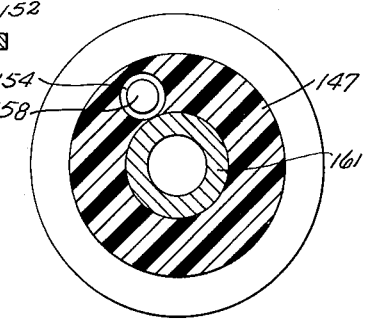
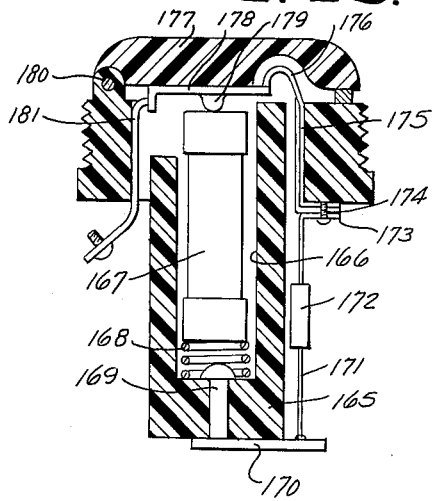
INVENTOR.
ULLE C. LINTON,
BY
Linton and Linton
ATTORNEYS.

United States Patent Office 3,225,163
Patented Dec. 21, 1965

3,225,163
INDICATOR FUSEHOLDER WITH CURRENT RESPONSIVE DEVICE
Ulle C. Linton, 4322 Alton Place NW., Washington 16, D.C.
Filed Mar. 28, 1961, Ser. No. 98,910
16 Claims. (Cl. 200—121)

The present invention is concerned with fuseholders for electrical cartridge type fuses and is directed to such holders for one or more of such fuses.

The principal object of the present invention is to provide fuseholders which will indicate when the fuse therein has been blown or ruptured or when the current within the line to which the fuseholder is connected has been discontinued.

A further and important object of the invention is to provide a fuseholder having a body and cap and which cap while normally closing said body will be automatically released from its body-closing position upon the discontinuance of current through the fuse within the holder or within the circuit to which the holder is connected.

A still further object of the invention is to provide a fuseholder which will automatically partially or wholly eject a fuse from therein when said fuse is blown due to overloads or the like within the circuit to which the fuseholder is connected.

A still further and also important object of the invention is to provide an economically produceable fuseholder and also a fuseholder which requires a minimum of space so as not to interfere with other elements positioned upon a panel board supporting said fuseholder.

Other objects of the invention will be in part obvious and in part pointed out in the following detailed description of the accompanying drawings wherein:

FIG. 1 is a cross-sectional view of a fuseholder for containing two cartridge fuses.

FIG. 2 is an exploded longitudinal sectional view of the fuseholder of FIG. 1 with portions broken away.

FIG. 3 is a top view of the body of said fuseholder with the top removed.

FIG. 4 is an end elevation of said fuseholder.

FIG. 5 is a top view of said fuseholder with the cover thereon.

FIG. 6 is a cross-sectional view of the lefthand portion of the fuseholder.

FIG. 7 is a bottom view of said fuseholder.

FIG. 8 is a cross-sectional view of a modification of the fuseholder of the previous figures.

FIG. 9 is an enlarged, detailed view of a portion of the fuseholder of FIG. 8.

FIG. 10 is a longitudinal, cross-sectional view of a fuseholder for one cartridge fuse.

FIG. 11 is a top view of the fuseholder of FIG. 10.

FIG. 12 is a longitudinal, cross-sectional view of another form of a single fuseholder.

FIG. 13 is a side elevation of reduced size of the fuseholder of FIG. 12.

FIG. 14 is a top view of FIG. 13.

FIG. 15 is an enlarged, detailed view of an element of the fuseholder of FIG. 12.

FIG. 16 is a third modification of a single fuseholder shown in longitudinal section.

FIG. 17 is a cross-sectional view taken on line 17—17 of FIG. 16.

FIG. 18 is a front elevation of a fourth modification of a single fuseholder.

FIG. 19 is a longitudinal, sectional view of the fuseholder of FIG. 18 mounted upon a supporting panel.

FIG. 20 is a bottom end view of said fuseholder with the cap removed.

FIG. 21 is a top view of a conductor forming an element of said fuseholder.

FIG. 22 is a partial view of a modified form of the fuseholder of FIG. 18 shown in longitudinal section.

FIG. 23 is a longitudinal section of the fifth modification of the single fuseholder.

FIG. 24 is a cross-sectional view taken on line 24—24 of FIG. 23.

And FIG. 25 is a longitudinal section of a sixth modification of a single fuseholder.

Referring now more particularly to the accompanying drawings wherein like and corresponding parts are designated by single reference characters and particularly FIGS. 1–7 inclusive wherein is shown an insulating body 1 having upwardly extending side walls 2. A plurality of bolts 3, 6, 10 and 11 extend through said body 1 to the bottom thereof. A resilient conductor 4 is fastened to bolt 3 and has a resilient end 5. Bolt 6 has a similar conductor 7 connected thereto with a flexible end 8. Body 1 has a partition 9 extending between said conductors.

Bolts 10 and 11 have similar conductors 5 and 8 connected thereto respectively.

Body 1 has a central open-top recess 12 in which is positioned a soft iron or steel core.

Cap 13 of insulating material has a recess 14 in which are positioned electric lamps 15 which may preferably be neon lamps or low-voltage incandescent lamps. An insulating plate 16 fixedly connected to cap 13 by any suitable means such as a drive screw 40 is retaining said lamps therein. A resistor 17 is connected to one lead of one of the lamps and also to a conudcting rivet 20. A second lead 18 of the lamp is connected to a rivet 19. Rivet 20 fastens a fuse clip 22 to plate 16 while rivet 19 fastens a second fuse clip 24 to said plate. Fuse clip 22 has a prong 23 which engages end 5 of conductor 4 while fuse clip 24 has a similar prong 25 which engages end 8 of the conductor 7 when cap 13 is mounted upon body 1 so that fuse clip 24 is in contact with bolt 3 and fuse clip 22 in contact with bolt 10. Fuse 26 mounted between fuse clips 24 and 22 completes the connection between bolts 3 and 10. A similar arrangement of lamps 15, resistors 17, fuse clips 22 and 24, and prongs 23 and 25 is provided on the opposite side of partition 9 for engaging bolts 6 and 11.

A soft iron or steel core 28 extends through plate 16 to within recess 14 and also exteriorly of said plate and is positioned for being inserted within recess 12 of body 1 to engage the core therein. A copper enameled wire coil surrounds the top portion of member 28 within recess 14 and has one end of said coil connected to the righthand resistor 17 by a wire 21. Lead 18 of the lamp is connected by wire 27 to the other end of said coil.

A second coil of copper enameled wire or the like surrounds the lower portion of member 28 within recess 14 and has one end connected by a wire 21 to the lefthand resistor and the other end of said coil connected by a wire 27 to the conductor 18 of the lefthand lamp.

In the use of the fuseholder, fuses 26 are mounted within clips 22 and 24 and cap 13 mounted upon the top of wall 2 with prongs 23 and 25 for both fuses engaging the conductors in said body. An electrical circuit can then be connected to bolts 3 and 10 for passing current through the fuse mounted thereto. A second circuit can be connected to nuts 6 and 11 for the same purpose. Should an overload or the like occur in one circuit, the fuse therein will become blown causing the current to flow through rivet 20 to resistor 17 and from there to lamp 15 and through lead 18 to rivet 19. The current will also flow through wires 21 and 27 and the coil connected thereto temporarily turning core 28 into an electromagnet. The core in body 12 is of a permanent magnetic material such as, for example, alnico, a ceramic magnet, or the like, which has been positioned to attract member 28 when cap 13 is on body 1 and no current is travelling through the coils surrounding member 28. However, the pole of core 12 facing member 28 is such that when said member 28 is temporarily magnetized, its pole will be the same and will thus repulse core 12 breaking the magnetic attraction therebetween. Cap 13 is of a transparent or translucent material so that the lighting of either lamp 15 will show therethrough indicating which fuse is blown. It will also indicate that the cap can be removed due to the temporary magnetic condition of magnet 28. Replacing the blown fuse and remounting cap 13 on body 1 will restore the current in the circuit, and core 12 will again attract member 28 retaining cap 13 on body 1.

FIGS. 8 and 9 of a modification of the aforementioned fuseholder has in lieu of member 28 and the magnetic core 12 a plunger 39 of a soft iron or steel fixedly mounted in cap 13 and extending between a pair of superimposed coils 30 and 33. Coil 30 is connected by wire 31 to one conductor 4 and by wire 32 to a second conductor 7. Coil 33 is connected by a wire 24 to one conductor 4 on the opposite side of partition 38 and wire 35 to a conductor 7 on the same side of said partition. Alternatively, as shown in FIG. 9, a pair of conducting plates 36 and 37 can be mounted upon both sides of partition 39 and connected to wires 34 and 35 respectively so that the fuse clips 22 and 24 on that side of the partition can engage these plates respectively. Thus, when current is passed through the fuses 26, coils 30 and 33 will be energized forming a solenoid drawing plunger 39 therein retaining cap 13 on body 1. Should either fuse blow, lamp 15 will indicate the same, and the cover can be withdrawn against the strength of the remaining coil which is broken by the lifting of the cover. Replacing the blown fuse in the cap 13 on the body 1 restores the current, and the two coils act to retain the cap on the body.

FIGS. 10 and 11 disclose a single fuseholder having an insulating body 41 which has a longitudinal open top recess 42 and a bottom 43. A conducting rivet 44 retains a conductor 45 against bottom 43 and extends within recess 42. A coil spring 46 is mounted within the bottom of said recess 42 and the second coil spring 47 is mounted upon rivet 44 within said recess. A conducting slide 48 has both springs bearing thereagainst and supports the lower end of a fuse 49.

A conductor 50 fastened by drive screw 51 to the upper portion 40 of said body extends within said body and has a resilient inner end 52 positioned adjacent the open end of recess 42.

Body 41 has peripheral threads 53 for having a nut 54 to retain said body on a panel. Said body also has a hinge 55 whose pin 56 extends through one side of the cap 57 pivotally connecting said cap to said body. An L-shaped conductor 58 is fastened to said cap by a drive screw 59 which can engage said fuse when the cap is in its closed position causing conductor 58 to engage end 52 of conductor 50. Said cap has a recess 60 in which is positioned a resistor 62 connected by wire 61 to conductor 58 and by wire 63 to one end of a coil 64 surrounding a soft iron or steel core 65 fixedly connected within said cap. The other end of said coil is connected to a terminal 67 which contacts terminal 68 mounted within said body when said cap is closed. At the same time, core 65 contacts a permanent magnet 66 fixedly mounted in body 41 whereupon said cap is drawn and retained on said body. Terminal 68 has a wire 69 connecting the same to conductor 45.

When conductors 45 and 50 are connected to an electrical circuit, current flows from conductor 50 to conductor 58, screw 59, fuse 49, slide 48, spring 47, rivet 44 to conductor 45. Should the fuse become blown, the current will be by-passed to wire 61, resistor 62, coil 64, terminals 67 and 68, wire 69 to conductor 45. Thus, core 65 will temporarily become an electromagnet whose pole engaging the pole of magnet 68 will be the same as that of said magnet pole repulsing the same releasing cap 13 whereupon said coil spring will push the fuse outwardly of body 1 pivoting said cap and breaking contact between conductors 58 and 50. Replacing a new fuse in body 1 and pushing cap 57 closed restores the current therethrough, but resistor 62 prevents the current from reaching coil 64 and thus magnet 68 attracts said core 65 retaining the cap closed.

The further fuseholder shown in FIGS. 12–15 inclusive employs an insulating body 70 having a bottom 71 in which is positioned a conductor 72 having a threaded external end with nuts 73 and 74 thereon. A coil spring 75 is positioned within said body on said conductor and supports a fuse 76 thereon.

A conductor 77 extends through said body and contacts a tubular conductor 78.

A longitudinal bore 79 extends into said body with a conducting strip 80 connected to said conductor 72 extending within said bore and having a flexible end 81.

Body 70 has a threaded periphery for engaging a nut 83 to retain fuseholder in a panel as shown. A conducting ring 84 is carried by a tubular portion 85 of an insulating block 87 fixedly mounted within a cap 86. A soft iron ring 88 is fixedly inserted within said block with one side thereof being exposed. A wire 89 is connected to ring 84 while a wire 91 is connected to a resistor 92 which, in turn, is connected by a wire 93 to a cylindrical conductor 94. Ring 88 has a coil 95 surrounding the same with said coil connected to said wires 89 and 91.

A permanent ring-shaped magnet 90 is mounted in the top end of body 7 for engaging the exposed side of ring 88 for attracting the same thereto for retaining said cap on said body.

Fuse 76 extends within cylindrical member 94, which member in turn engages conductor 78 when said cap is on said body. With conductors 77 and 72 connected to an electrical circuit, current will pass from conductor 77 to conductor 78, conductor 94, fuse 76, spring 75, conductor 72. Upon the fuse being blown, the current will pass from conductor 94 through wire 93, resistor 92, wire 91, coil 95, wire 89, ring 84, strip 81 to conductor 72. The current passing around coil 95 temporarily causes ring 88 to become an electromagnet whose pole facing magnet 90 temporarily becomes the same as the pole of said magnet repulsing and breaking the magnetic attraction. Coil spring 75 pushes fuse 76 upwardly separating cap 86 from body 70 breaking connection in the current. Replacing a new fuse 76 and re-mounting cap 86 on body 70 restores the current. Resistor 92 prevents the current from travelling to coil 95 and thus magnet 90 again attracts ring 88 which is no longer magnetized.

A further form of fuseholder having a single fuse is shown in FIGS. 16 and 17 and has an insulating body 101 which has peripheral threads 102 for receiving a nut 103 to retain the body upon a panel or the like. A cylindrical extension 104 of said body has a rivet 105 extending through the bottom thereof and retaining a conductor 106 against said bottom. Said extension has a cylindrical central bore 107 for receiving a cartridge fuse 108. Said fuse is supported within said bore upon a conducting slide 108. Said fuse is supported within said bore upon a conducting slide 109 supported by a pair of coil springs 110 and 112. Slide 109 has a tubular extension 111 separating said springs while the inner spring 110 is seated upon and connects rivet 105.

An insulating cap 113 is pivotally connected at one side to a hinge 115 of said body by means of a pin 114 extending therethrough.

A soft iron or steel plunger 116 is fixedly connected at one end to the opposite side of said cap and extends therefrom for being inserted within a coil 117 mounted within a cavity 118 in said body.

Said coil is preferably of an insulated annealed copper and has one end connected by a wire 119 to a conductor 120 which contacts the upper end of fuse 108. The other end of said coil is connected to a conductor 121 fixedly attached to body 101 by drive screw 122. A conducting strip 123 joins said coil to said conductor 121.

In the operation of the present fuseholder, conductors 106 and 121 are connected to an electrical circuit so the current passes from conductor 121 through strip 123, coil 117, wire 119, conductor 120, fuse 108, slide 109, spring 110, rivet 105 to conductor 106.

The current passing through coil 117 functions as a solenoid drawing plunger 116 therein and retaining cap 113 closed upon the body 101. Should the current to the conductors 121 and 106 be discontinued or the fuse 108 blown, the current would be discontinued from coil 117 eliminating its attraction to plunger 116. Thereupon, the coil springs 110 and 112 pushing against slide 109 would push fuse 108 against cap 113 pivoting the same from body 101 and partially or completely ejecting the fuse. Thus, a person observing the same would know that this fuseholder is connected to a circuit which requires repairs or replacement of the fuse.

A still further form of single fuseholder is shown in FIGS. 18–21 inclusive and consists of an insulating body 126 having an open top bore 127. A threaded end conductor 128 extends through said body and has a terminal end 129 positioned in the bottom of said bore 127. A second threaded end conductor 130 has a ring-shaped end portion 131 encircling the top open end portion of said bore 127 with a threaded inner wall 132. Conductors 138 and 130 preferably extend from a common side of body 126 which may have a flat configuration to permit the same to be mounted against the panel board A. That is, terminals 128 and 130 are substantially parallel and extend in the same plane longitudinally of body 126.

A coil spring 134 is fixedly connected to terminal 129 by soldering or the like and bears against an electrical cartridge fuse 135 extending longitudinally of bore 127. A cylindrical conductor 136 receives an end of fuse 135 within the bore 138 thereof and has said fuse in contact with said conductor. An insulating cap 137 is fixedly connected to said conductor 136 and said conductor has peripheral threads whereby it can be in threaded engagement with the threads 132 of conductor 130 closing bore 127.

In the use of this fuseholder, conductors 128 and 130 are connected to an electrical circuit, and the current passes through conductor 128, spring 134, fuse 135, conductor 136, conductor 130. It is to be appreciated that this fuseholder while shown with its bottom face 139 positioned downwardly, can be equally well mounted in other positions, that is with said bottom face at the top or in the reversed position to that presently shown. Also, body 126 can house a plurality of bores 127 and conductors 128 and 130 with conductors 136 for a plurality of fuses or said body can have flat sides so that a plurality of these fuse holders can be positioned contiguous to one another.

FIG. 22 covers an indicating fuseholder which is the same as that shown in FIGS. 18–21 inclusive with the addition of a side recess 140 in body 126 which contains a wire 141 connected to terminal 129 and a resistor 142. Said resistor is connected to one terminal 144 of an electric lamp 143 while the second terminal 145 of said lamp is connected to end 131 of conductor 130. Recess 140 is closed by a transparent or translucent panel 146 attached to body 126 by an adhesive or the like.

In this indicating fuseholder, when the fuse 135 is blown, the current will pass from terminal 129 to wire 141, resistor 142, wire 144, lamp 143, terminal 145 to conductors 131 and 130 whereupon the lamp 143 will glow or light and shine through panel 146 indicating the blown condition of the fuse. Replacement of the new fuse 135 will restore the current therethrough and lamp 143 will no longer light.

FIGS. 23 and 24 disclose a single fuseholder which will indicate the blown condition of the fuse and which is relatively short in its overall length. Said fuseholder consists of an insulating body 147 having an open top recess 148 for receiving a portion of a fuse 149. A coil spring 150 supports said fuse within said bore upon a terminal 151 extending through said body having a threaded extension 152. Said conductor also has an extension 153 extending into a second bore 154 in said body. A wire 155 connects a resistor 156 to extension 153 while a terminal 157 connects lamp 158 to said resistor. A second terminal 159 of said lamp is connected to a ring-shaped conductor 160 which encircles the top open end of recess 148 and has a threaded internal wall. Said conductor 160 also has an extension 161 extending from said body.

An insulating cap 162 contains a cylindrical conductor 163 having an internal bore 164 for receiving the upper end of fuse 149 in contact therewith and which conductor 163 has peripheral threads for being in threaded engagement with conductor 160 for closing recess 148. Recesses 148 and 154 extend longitudinally of said body while recess 154 is open at the top thereof. Cap 162 is preferably of a transparent or translucent material so that the light from lamp 158 will be seen therethrough or close said cap to be lighted.

In the use of this fuseholder of FIG. 23, conductors 152 and 161 are connected to an electrical circuit so that the current flows from conductor 152, terminal 151, coil 150, fuse 149, conductor 163 to conductors 160 and 161. Upon the blowing of said fuse, the current will pass to extension 153, wire 155, resistor 156, terminal 157, lamp 158 terminal 159 to condensers 160 and 161. Replacing the blown fuse with a good fuse restores the normal current, and lamp 158 will no longer be lighted.

FIG. 25 discloses a single fuseholder having a cylindrical insulating body 165 with a central bore 166 for containing a fuse 167 mounted upon a coil spring 168 in contact with extension 169 of the conductor 170. The wire 165 is connected to conductor 170 and to a resistor 172, which resistor is connected by wire 173 to a bimetallic latch 175 fixedly connected to said body and having a hook-shaped end 176.

An insulated cap 177 has a conductor 178 fastened to the bottom face thereof and extending for engagement with latch end 176 as shown in said drawing. A drive screw 179 fastens said conductor 178 to said cap and also engages fuse 167. A pin 180 extends through said body, and one side of said cap is pivotally connecting the same together. A further conductor 181 fixedly attached to said body is positioned for engaging conductor 178 when said cap is in its closed position.

By connecting conductor 170 and conductor 181 to an electrical circuit, current will flow through extension 169, spring 168, fuse 167, screw 179, conductor 178 to conductor 181. However, upon the blowing of said fuse, the current will pass from conductor 170 to wire 171, resistor 172, wire 173, bimetallic element 175, conductor 178 to conductor 181. The current passing through said bimetallic element 175 will heat the same causing it to move from engagement with conductor 178 whereupon spring 168 will move the fuse and open cap 177. Replacement with a new fuse will restore the original circuit together with pushing cap 177 closed as the element 175 will cool and return to its latching position.

Transparent or translucent materials referred to herein may preferably be produced from plastics known as Lucite, Lexan or Merlin. The insulating bodies and caps may be made of various electrically insulated plastics, hard rubber, or ceramics as desired.

The fuseholders are capable of considerable modification and any such changes thereto as come within the scope of the appended claims are deemed to be a part of the invention.

I claim:

1. A fuseholder comprising a body having at least one recess for receiving at least one electrical cartridge-type fuse, a cap for closing said body recess, terminals carried by said body and cap, a fuse positioned in said body recess and connected in series with said body and cap terminals, a magnet mounted on said body, a ferrous member mounted on said cap for engaging said magnet tending to retain said cap on said body, and means connected to said terminals capable of temporarily magnetizing said member for repulsing said magnet upon said fuse becoming inoperative.

2. A fuse holder comprising a body having at least one recess for receiving at least one electrical cartridge-type fuse, a cap for closing said body recess, terminals carried by said body and cap, a fuse positioned in said body recess and connected in series with said body and cap terminals, a ferrous plunger carried by said cap, and a coil carried by said body for receiving said plunger therein when said cap is mounted on said body and means connecting said coil to said terminals for receiving current therefrom until the fuse becomes inoperative, for drawing said plunger into said coil and said cap on said body.

3. A fuseholder comprising a body, at least a pair of contact terminals carried by said body, a cover having at least a pair of fuse clips, positioned for engaging said body contact terminals when said cover is positioned on said body, an electrical cartridge-type fuse having the ends thereof retained in said fuse clips, a magnet mounted on said body, a ferrous member mounted on said cover for engaging said magnet, a coil encircling a portion of said member and connected to said fuse clips for receiving current therefrom when said fuse becomes inoperative temporarily magnetizing said member for repulsing said magnet and releasing said cap from said body.

4. A fuseholder comprising a body having a recess, an electrical cartridge-type fuse positioned in said body recess, a contact terminal mounted in said body for engaging one end of said fuse, a cap for closing said body recess, a second contact terminal carried by said cap for engaging the other end of said fuse, a magnet connected to said body, a ferrous member connected to said cap for contacting said body magnet retaining said cap on said body, a coil encircling a portion of said member, means connecting said coil to said terminals for receiving current therefrom when the fuse becomes inoperative, temporarily magnetizing said member repulsing said magnet and releasing said cap from said body.

5. A fuseholder as claimed in claim 4, wherein said connecting means includes a pair of electric conductors each connecting a different end of said coil to a different one of said terminals and an electrical resistor interconnected in one of said conductors.

6. A fuseholder as claimed in claim 4, wherein said connecting means includes a pair of wires each connecting a different end of said coil to a different one of said terminals, an indicating lamp, and a resistor interconnected with said lamp and one of said wires.

7. A fuseholder as claimed in claim 4, wherein resilient means is mounted in said body for moving the fuse therein against said cap and thus said cap from said body when said cap is released.

8. A fuseholder as claimed in claim 4, wherein said cap is pivotally connected at one side to one side of said body.

9. A fuseholder comprising a body having a recess, an electrical cartridge-type fuse positioned in said body recess, a terminal in said body for engaging one end of said fuse, a cap for closing said body recess, a terminal carried by said cap for engaging the other end of said fuse, at least one magnet mounted in said body, an annular ferrous member mounted in said cap for engaging said magnet when said cap is mounted on said body, a coil encircling a portion of said member, means connecting coil to both said terminals for receiving current therefrom when said fuse becomes inoperative, temporarily magnetizing said member repulsing said magnet and releasing said cap from said body.

10. A fuse holder as claimed in claim 9, wherein said connecting means includes a pair of electrical conductors each connecting a different end of said coil to a different one of said terminals and a resistor interconnected in one of said conductors.

11. A fuseholder as claimed in claim 9, wherein said cap terminal is of a cylindrical configuration, an annular conductor is mounted in said body for having said cap terminal inserted therein in sliding engagement therewith for guiding said cap to and from said body, and means extending through said body to said annular conductor providing an external wire connector.

12. A fuseholder as claimed in claim 9, which has resilient means mounted in said body tending to move said fuse against said cap for moving said cap from said body upon the release of said cap.

13. A fuseholder comprising a body having a recess, an electrical cartridge-type fuse positioned in said body recess, a terminal in said body for engaging one end of said fuse, a cap for closing said body recess, at least one ferrous plunger carried by said cap, at least one coil mounted in said body for receiving said plunger therein when said cap is on said body, a second terminal carried by said body, a conductor for electrically connecting said coil and the other end of said fuse, and a second conductor electrically connecting said coil and said second-mentioned terminal for retaining said cap on said body until said fuse is blown.

14. A fuseholder comprising a body of electrical insulating material having a bore capable of receiving a portion of an electrical cartridge-type fuse longitudinally thereof and which bore has a closed bottom end and an opposite open end, a conductor extending through said body and laterally of and having a terminal end mounted in said body bore closed end and a threaded end positioned exteriorly of said body, a resilient member mounted on said terminal end and extending longitudinally of said body bore, a second conductor extending through and laterally of said body in the same direction as said first mentioned conductor, said second conductor having a ring-shaped terminal end positioned in said body encircling the open end of said body bore which ring-shaped terminal has a threaded inner wall exposed within said body bore, said second conductor further having a threaded end positioned exteriorly of said body, a cylindrical cap of electrical conducting material and capable of receiving the remaining portion of said fuse therein, said cap having a threaded periphery being removably mounted in threaded engagement with said ring-shaped terminal threaded inner wall and closing said body bore open end and an insulating cap having said cap attached to and extending therefrom.

15. A fuseholder as claimed in claim 14, wherein said body has an open top recess in the exterior thereof with both said terminal end and said ring-shaped terminal exposed therein, an electric lamp is positioned in said body recess and is electrically connected to said terminals, and a light transmitting electrically insulating plate extends across said body recess open top closing said recess and is fixedly attached to said body.

16. A fuseholder comprising a body of electrical insulating material having a pair of parallel recesses and a flat top, said body recesses each having a closed bottom end and an opposite open end opening in said body flat top, one of said body recesses being capable of receiving a portion of an electrical cartridge-type fuse therein, a conductor extending across the closed bottom ends of said body recesses and from said body, a second conductor having a tubular-shaped terminal with a threaded bore contiguous with said one of said body recesses and an end extending from said body, an electric lamp positioned in the other of said recesses and electrically connected to the portions of said terminals in said other recess, a light transmitting cap having a flat face capable of being mounted on said body flat top, closing the open ends of both said body recesses and conducting light from said lamp when lit, a cylindrical conductor attached to said cap and extending normal to and from the flat face of said cap, said cylindrical conductor being capable of receiving the remainder of said fuse and having a threaded periphery being removably mounted in threaded engagement with said tubular-shaped terminal threaded bore for drawing said cap flat face against said body flat top.

References Cited by the Examiner

UNITED STATES PATENTS

| | | | |
|---|---|---|---|
| 1,112,156 | 9/1914 | Murray | 200—129 |
| 1,138,170 | 5/1915 | Allgood | 340—250 |
| 1,450,670 | 4/1923 | La Mar | 200—121 |
| 1,488,263 | 3/1924 | Mandra | 200—121 |
| 2,090,302 | 8/1937 | Montgomery et al. | 317—165 |
| 2,147,754 | 2/1939 | Rivers | 200—121 |
| 2,300,386 | 10/1942 | Lehmann | 200—114 |
| 2,474,970 | 7/1949 | Calkins | 200—116 |
| 2,672,257 | 3/1954 | Simmonds. | |
| 2,851,558 | 9/1958 | Linton | 200—121 |
| 2,888,290 | 5/1959 | Pierce | 292—251 |
| 3,139,498 | 6/1964 | Linton | 200—121 |

FOREIGN PATENTS

| | | |
|---|---|---|
| 572,123 | 2/1924 | France. |
| 1,115,645 | 1/1956 | France. |
| 182,660 | 2/1907 | Germany. |
| 318,996 | 9/1930 | Great Britain. |
| 173,171 | 2/1935 | Switzerland. |

BERNARD A. GILHEANY, *Primary Examiner.*

WALTER STOLWEIN, *Examiner.*